(12) United States Patent
Richards et al.

(10) Patent No.: US 10,391,898 B1
(45) Date of Patent: Aug. 27, 2019

(54) TORSO EQUIPMENT SUPPORT SYSTEM (TESS)

(71) Applicant: BAE Systems Land & Armaments L.P., Arlington, VA (US)

(72) Inventors: Marvin K. Richards, Mesa, AZ (US); James P. Olofsson, Gold Canyon, AZ (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 0 days.

(21) Appl. No.: 15/995,988

(22) Filed: Jun. 1, 2018

(51) Int. Cl.
| | | |
|---|---|---|
| *B60N 2/68* | (2006.01) | |
| *A41D 13/05* | (2006.01) | |
| *B60R 22/00* | (2006.01) | |
| *A62B 35/00* | (2006.01) | |
| *B60N 2/42* | (2006.01) | |
| *B60R 22/02* | (2006.01) | |
| *B64D 11/06* | (2006.01) | |
| *A45F 3/06* | (2006.01) | |

(52) U.S. Cl.
CPC ....... *B60N 2/4242* (2013.01); *A41D 13/0531* (2013.01); *A62B 35/00* (2013.01); *B60N 2/688* (2013.01); *B60R 22/02* (2013.01); *B64D 11/0619* (2014.12); *A45F 3/06* (2013.01); *B60R 2022/027* (2013.01)

(58) Field of Classification Search
CPC ............ B64D 11/062; B60R 2022/286; B60R 2022/287; B60R 2021/0058; B60R 21/00; B60R 22/00; B60N 2/688; A41D 13/0531
See application file for complete search history.

(56) References Cited

U.S. PATENT DOCUMENTS

| | | | | |
|---|---|---|---|---|
| 3,203,733 | A * | 8/1965 | Priest ..................... | B60R 21/02 297/486 |
| 8,419,127 | B1 * | 4/2013 | Wilhelm ................. | B60R 22/02 280/808 |
| 9,370,237 | B2 | 6/2016 | Hiemenz et al. | |
| 10,065,596 | B2 * | 9/2018 | Fisher ................... | B60R 22/023 |
| 2009/0322067 | A1 * | 12/2009 | Nezaki ................... | B60N 2/002 280/807 |
| 2010/0219667 | A1 | 9/2010 | Merrill et al. | |

(Continued)

FOREIGN PATENT DOCUMENTS

GB 2435244 A * 8/2007 ............. B60N 2/688

*Primary Examiner* — Timothy J Brindley
(74) *Attorney, Agent, or Firm* — Patterson Thuente Pedersen P.A.

(57) ABSTRACT

A torso equipment support system, for use with a seat bucket of an aviation or ground vehicle, providing upper torso and worn equipment support to an occupant. The system includes a base, a flexible column, a support beam, and a shoulder harness assembly. The shoulder harness assembly is coupled to the support beam and configured for releasable attachment with shoulder belts worn by the occupant. The shoulder harness assembly includes a yoke and a set of restraint shoulder straps. The yoke is slideably coupled to the support beam at a first vertically oriented portion and has a second portion that is split into two horizontally projecting members for extension over the shoulders of the occupant. The set of restraint shoulder straps project inwardly for extension over the shoulders of the occupant from at least one retractor, and extend to the horizontally projecting members.

20 Claims, 4 Drawing Sheets

(56) References Cited

U.S. PATENT DOCUMENTS

| | | | |
|---|---|---|---|
| 2012/0025588 A1* | 2/2012 | Humbert | B60N 2/24 |
| | | | 297/480 |
| 2012/0137418 A1* | 6/2012 | Nelson | A41D 13/0512 |
| | | | 2/468 |
| 2014/0300154 A1* | 10/2014 | Pfister | B60R 22/32 |
| | | | 297/250.1 |
| 2015/0183396 A1* | 7/2015 | Humbert | B60R 22/4619 |
| | | | 242/389 |
| 2017/0089669 A1* | 3/2017 | Levine | A41D 13/0025 |
| 2018/0297554 A1* | 10/2018 | Ortiz | B60R 22/48 |

* cited by examiner

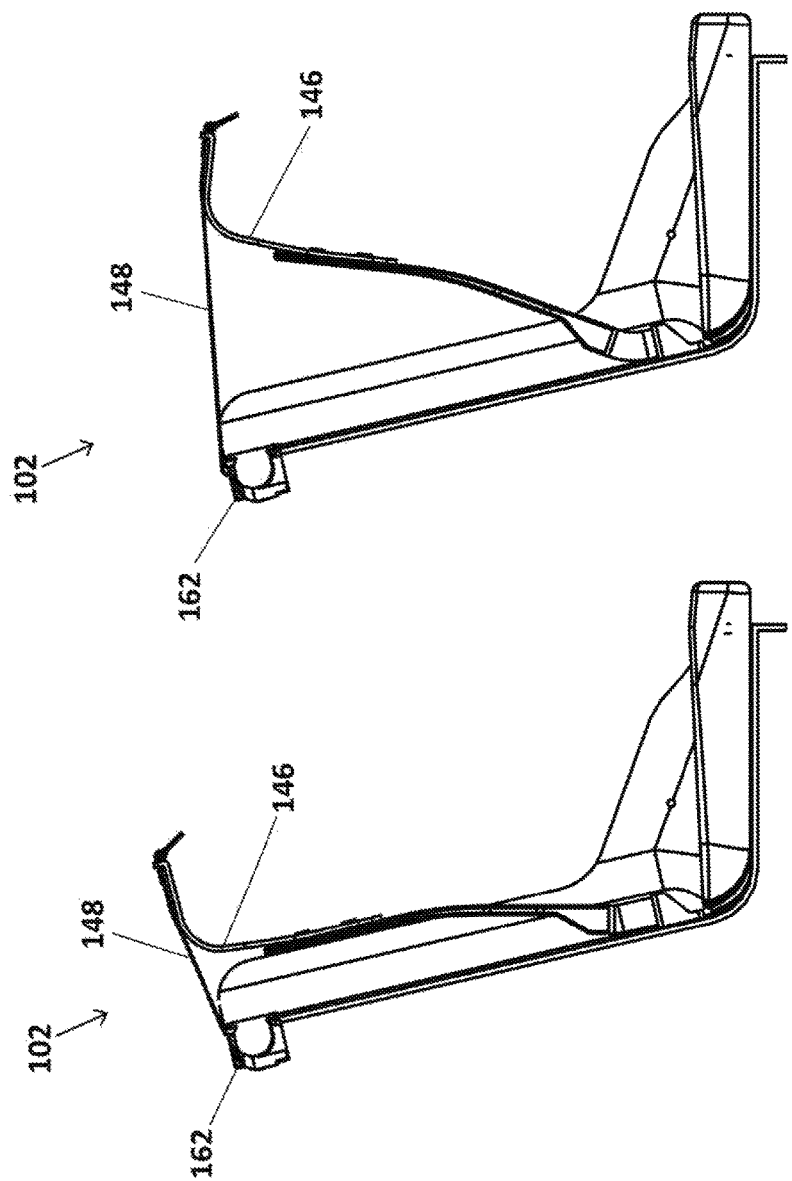

TORSO EQUIPMENT SUPPORT SYSTEM (TESS)

TECHNICAL FIELD

This disclosure relates to support systems that can be used with vehicle seating systems, and more particularly, to support systems that assist with the weight of gear worn by an occupant that can be used with or as part of vertical axis energy absorbing seats. Vertical axis energy absorbing seats can include rotorcraft crashworthy seats or mine blast resistant ground vehicle seats, for example.

BACKGROUND

During high vertical acceleration events, such as a rotorcraft crash or ground vehicle mine blast event, the spine of an occupant can fracture due to compressive loading. To limit spinal loading, energy absorbing (or load limiting) seats have sometimes been utilized in aviation and ground vehicles. Any additional weight borne by the upper torso of an occupant of an aviation or ground vehicle, such as a helmet, armored vest, survival gear, etc., generally adds to the compressive loading of the spine during a crash or blast event, thereby increasing the risk of injury. To counter the effects of added upper torso weight, some seat energy absorbers could be set at a lower stroking load. However, such a modification also requires more seat stroke, space for which is not available in many existing aviation and ground vehicles.

Excessive weight mounted to the upper torso of an occupant also increases muscle fatigue for rotorcraft pilots who often operate in the helo-hunch position. The poor posture of the occupant combined with vibratory exposure can lead to chronic back injury/pain during extended missions which can affect mission capability and readiness.

One prior disclosure, in U.S. Pat. No. 9,370,237, describes an active spinal support system that utilizes a multi-segmented spinal column with tension tendons actuated by electrical motors. The active spinal support system arrangement, however, is complex, heavy, and costly. In addition, the active spinal support system disclosed does not provide precise positioning of the occupant torso position and is only effective in certain crash situations.

Accordingly, there is a desire for improved vehicle seating support systems that will provide enhanced seating of increased safety which will provide an effective resistive force to occupant motion and reduce compressive loading on the spine of an occupant in the event of a crash or blast to a vehicle.

SUMMARY

Embodiments relate to support systems that can be used on or with vertical axis energy absorbing seats, commonly used in rotorcraft crashworthy seats or mine blast resistant ground vehicle seats. The support systems generally enable the weight of gear worn on the occupant upper torso to be offloaded, thereby increasing occupant comfort, reducing fatigue, and reducing vibration loading/injury to the occupant spine. Additionally, embodiments provide a resistive force pulling the occupant to the upright position, thereby reducing muscle force and fatigue. Further, embodiments permit the inertial weight of the occupant upper torso gear to be offloaded during a high vertical acceleration event, such as a helicopter crash, ground vehicle mine blast event, or ground vehicle suspension bottoming.

One embodiment relates to a torso equipment support system, for use with a seat bucket of an aviation or ground vehicle, providing upper torso and worn equipment support to an occupant. The torso equipment support system includes a base, a flexible column, a support beam, and a shoulder harness assembly. In the system, the base mounts to the seat bucket at a first lower location. The flexible column is coupled to the base and biased toward a vertically upright orientation. The support beam is coupled to and vertically disposed above the flexible column and the shoulder harness assembly is coupled to the support beam and configured for releasable attachment with shoulder belts worn by the occupant. The shoulder harness assembly includes an adjustable yoke and a set of restraint shoulder straps. The adjustable yoke is slideably coupled to the support beam at a first vertically oriented portion permitting vertical height adjustment and a having a second portion that is split into two horizontally projecting members for extension over the shoulders of the occupant. The set of restraint shoulder straps project inwardly for extension over the shoulders of the occupant from at least one retractor located at a second upper location on the seat bucket, and extends to fixed engagement with the two horizontally projecting members.

An embodiment relates to a vehicle seating system providing upper torso and worn equipment support to an occupant. The vehicle seating system includes a seat system and a torso equipment support system that is coupled to the seat system. Specifically, the seat system includes: a vehicle seat including a bottom cushion portion and an upright seat back having a top and a bottom; and a vest for wear by the occupant that includes a pair of shoulder belts for releasable coupling. The torso equipment support system is coupled to the seat system and includes a vertical support assembly structure and a shoulder harness assembly. The vertical support assembly structure has a first end and a second end vertically disposed from one another. The first end is fixedly secured near the bottom of the upright seat back. The shoulder harness assembly is coupled to the vertical support assembly structure, and includes an adjustable yoke and a set of restraint shoulder straps. The adjustable yoke is slideably coupled to the second end of the vertical support assembly structure and includes two generally horizontally projecting members for extension over shoulders of the occupant. The set of restraint shoulder straps project inwardly for extension over the shoulders of the occupant from at least one retractor secured to the vehicle seat. The restraint shoulder straps extend to engagement with the two horizontally projecting members. Further, the shoulder harness assembly is configured for releasable coupling with the pair of shoulder belts.

The above summary is not intended to describe each illustrated embodiment or every implementation of the subject matter hereof. The figures and the detailed description that follow more particularly exemplify various embodiments.

BRIEF DESCRIPTION OF THE FIGURES

Subject matter hereof may be more completely understood in consideration of the following detailed description of various embodiments in connection with the accompanying figures, in which:

FIG. 4A is a side view of a partial vehicle seating system including a TESS in an upright position, according to an embodiment.

FIG. 4B is a side view of a partial vehicle seating system including a TESS in a forward flexed position, according to an embodiment.

Figure 1:
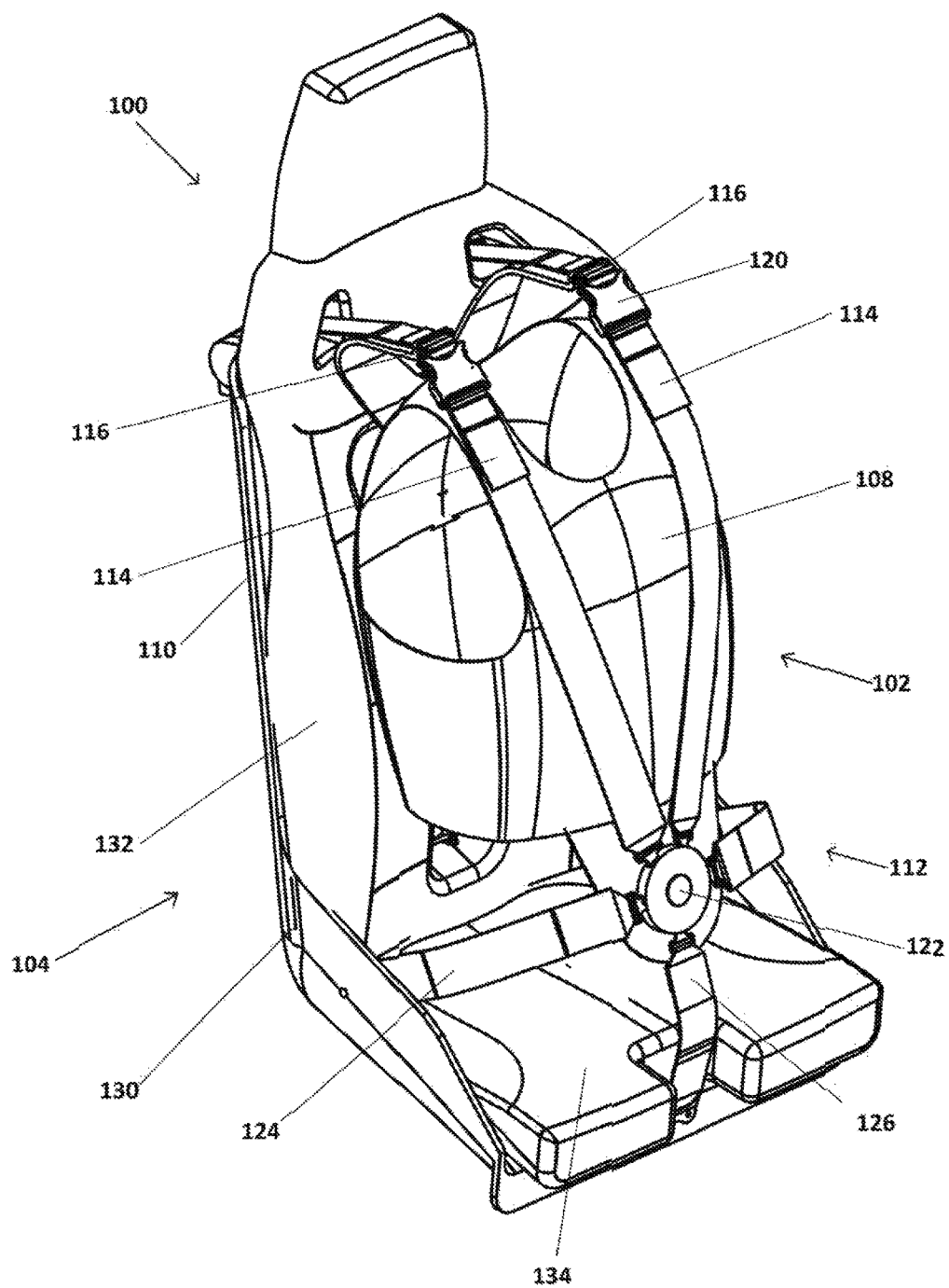
FIG. 1 is a perspective view of an overall vehicle seating system including a TESS (Torso Equipment Support System) and a seat system with an occupant vest installed, according to an embodiment.

While various embodiments are amenable to various modifications and alternative forms, specifics thereof have been shown by way of example in the drawings and will be described in detail. It should be understood, however, that the intention is not to limit the claimed subject matter to particular embodiments described. On the contrary, the intention is to cover all modifications, equivalents, and alternatives falling within the spirit and scope of the subject matter as defined by the claims.

DETAILED DESCRIPTION OF THE DRAWINGS

Embodiments generally provide a vertical support load path for occupants of vertical axis energy absorbing seats, which offloads the high vertical forces from an occupant's spinal column thereby reducing injury risk without requiring longer stroking distances.

FIG. 1 shows an overall view of a vehicle seating system 100 including a Torso Equipment Support System (TESS) 102 installed on a seat system 104. Embodiments of TESS 102 may take on various forms and can be used with modified existing vehicle seating or as part of new vehicle seating. The embodiments disclosed herein should not be viewed as limited to a particular style or type of seat.

The vehicle seating system 100 generally provides upper torso and worn equipment support to an occupant. In FIG. 1, seat system 104 is shown to include occupant vest 108, vehicle seat 110, and lap restraints 112. The occupant vest 108 is intended for occupant wear and includes a pair of shoulder belts 114 for releasable coupling with the TESS 102, as later described. The shoulder belts 114 are adjustable in length at yoke attachment points 116. The vest 108 is designed as a load bearing feature so that the high mass items (occupant gear) are supported through the attachment points 116. Upper attachment buckles 120 can be present on the vest 108, proximate such attachment points 116, as part of the shoulder belts 114. In some embodiments, upper attachment buckles 120 can be connected to a primary restraint release buckle 122 (using cables for example) that is also responsible for releasing the various lap restraints 112. In such an arrangement, the occupant can egress from the seat 110 by activation of the single rotary primary restraint release buckle 122, just like a standard restraint system.

A plurality of lap restraints 112 are present in various embodiments of the seat system 104. Lap restraints 112 may include restraint lap belts 124 and a tie down strap 126 (crotch strap). Lap restraints 112, including the restraint lap belts 124 and tie down strap 126, should be understood to be attached to the seat 110 (or specifically, seat bucket 130), but are removed in subsequent graphics for clarity.

Also comprising seat system 104, and shown in FIG. 1, is a vehicle seat 110. Vehicle seat 110 generally includes a seat bucket 130, seat back cushion 132, and seat pan cushion 134. Seat bucket 130 is generally comprised of an upright seat back 130a and a bottom portion 130b on which seat pan cushion 134 is located (See FIG. 2). Upright seat back 130a includes a top 133 and a bottom 135. In FIG. 1, a seat back cushion 132 is shown largely covering the inside surface of the upright seat back 130a. As shown, seat back cushion 132 generally has material cut away from a typical seat back cushion arrangement to provide space for the TESS 102.

Figure 2:
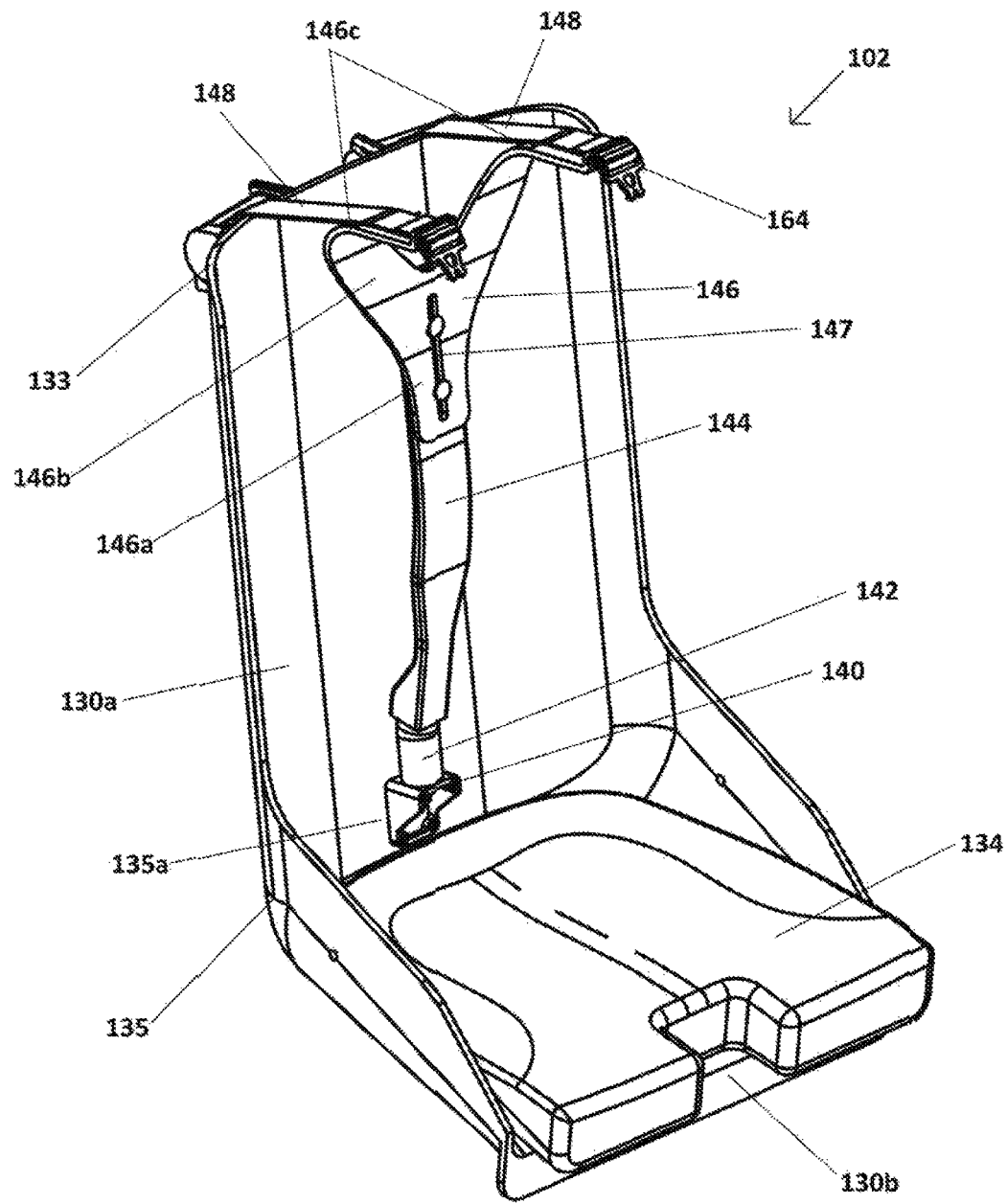
FIG. 2 is a perspective view of a partial vehicle seating system including a TESS and a partial seat system where the vest and seat back cushion is removed, according to an embodiment.

FIG. 2 shows a partial vehicle seating system 100 with the vest 108 and seat back cushion 132 removed to primarily show the TESS 102. The main components of the TESS 102 include a base 140, a flexible column 142, a support beam 144, an adjustable height yoke 146, and restraint shoulder straps 148.

Base 140 is mounted to seat bucket 130 at a first lower location 135a that is centered proximate the bottom 135 of upright seat back 130a. Base 140 is a mounting structure component capable of being fixedly secured to and projecting inwardly from the upright seat back 130a near the bottom 135 of the seat bucket 130.

The flexible column 142 can be made from elastomer (i.e. rubber), a spring, or even a mechanical joint such as a spherical or u-joint. Flexible column 142 is coupled to the base 140 and is generally biased toward a vertically upright orientation. A vertically upright orientation can correspond to a member with a generally vertically disposed axis generally aligned with its primary body structure in some embodiments, as shown in FIG. 2, for example. The flexible column 142 is biased to remain upright, thus any occupant upper torso motion produces a resistive force tending to return the occupant upright. The stiffness of the column 142 will be sized to counterbalance the overturning moment created by the occupant slouching forward (i.e. helo-hunch position). The flexible column 142 will also allow torsional twist (about the vertical axis). A short column 142 is expected to prevent buckling during high vertical loads (crash or mine blast events).

Support beam 144 is shown coupled to and vertically disposed above the flexible column 142. The support beam 144 can be made from any structural material (metal, composite, etc.). In some embodiments, the beam 144 will be contoured to follow the natural shape of the occupants' spine. The support beam 144 transfers the loading from the yoke 146 to the flexible column 142.

In some embodiments, the base 140, flexible column 142, and support beam 144 may collectively be referred to as a vertical support assembly structure 150. Vertical support assembly structure 150 can be understood as a structure of various components having a first end 152 and a second end 154 vertically disposed from one another (See FIG. 3). The first end 152 is generally fixedly secured near the bottom 135 of the upright seat back 130a of the seat 110. The second end 154 of the vertical support assembly structure 150 can be slideably coupled to an adjustable yoke 146. In some embodiments, the vertical support assembly structure 150 is at least partially located within a seat cushion 132 covering the upright seat back 130a of the vehicle seat 110.

In some embodiments, yoke 146 and restraint shoulder straps 148 can be understood to collectively form a shoulder harness assembly 160 that is coupled to the vertical support assembly structure 150. Specifically, in some embodiments, shoulder harness assembly 150 is coupled to the support beam 144 and is configured for releasable attachment with shoulder belts 114 worn by an occupant. In some embodiments, webbing retractors 162 may be included in shoulder harness assembly 160 as well. In some embodiments, the vertical support assembly structure 150 and the shoulder harness assembly 160 can comprise a TESS 102 that is coupled to a seat system 104.

The yoke 146, of a shoulder harness assembly 150, is a structural component which provides a load path from the occupant vest 108 to the support beam 144. The yoke 146 is adjusted higher than the shoulders of an occupant to provide the offloading function. The yoke 146 is adjustable in height relative to the support beam 144 with a height adjustment feature 147. This adjustment would be made prior to an occupant sitting in the seat and would include a positive lock. Accordingly, the adjustable yoke 146 can be slideably coupled to the support beam 144 at a first vertically oriented portion 146*a*. This first vertically oriented portion 146*a* permits vertical height adjustment. The adjustable yoke 146 has a second portion 146*b* that is split into two horizontally projecting members 146*c* for extension over the shoulders of the occupant as well.

A set of restraint shoulder straps 148 is shown in the figures as well. The set of restraint shoulder straps 148 projects inwardly for extension over the shoulders of the occupant from at least one retractor 162 secured to the vehicle seat 110. Further, the set of restraint shoulder straps 148 extend to fixed engagement with the two horizontally projecting members 146*c* of the yoke 146.

Figure 3:
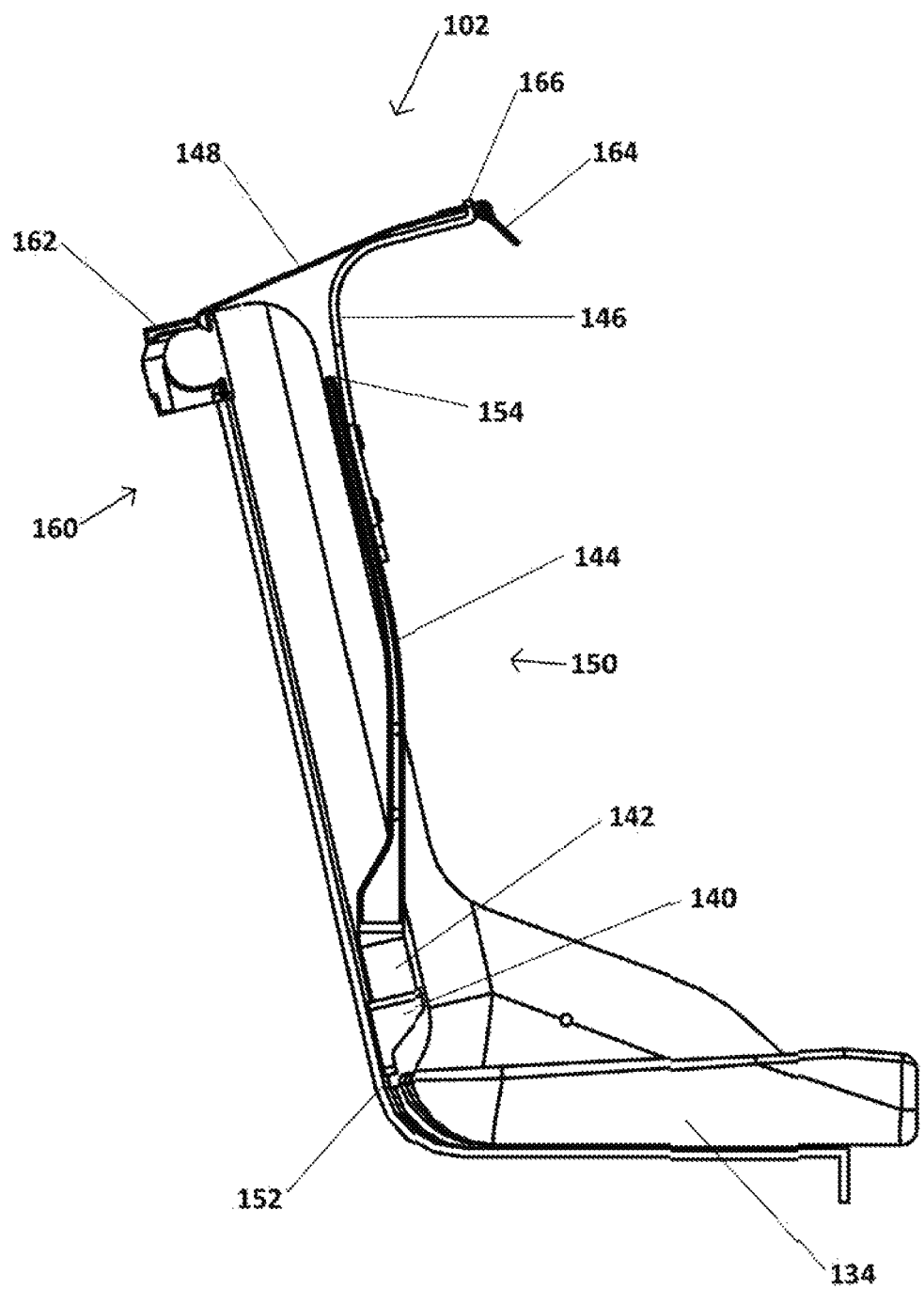
FIG. 3 is a side view of a partial vehicle seating system including a TESS where the vest, seat back cushion, and bucket seat of the seat system are removed, according to an embodiment.

FIG. 3 shows a side view of the TESS 102 with other seat components removed for clarity. This view better shows the shoulder straps 148 and webbing retractors 162 (inertia reels). In some embodiments, the set of restraint shoulder straps 148 project from two retractors 162 that comprise dual inertial reels. In some embodiments, the set of restraint shoulder straps 148 project from a single retractor 162 that is an inertial reel. Use of dual inertia reels (retractors 162) can typically better accommodate occupant twisting motion, but a single inertial reel 162 with a load splitter or "Y" belt can also be used. The inertia reels 162 can also be located at other locations or even off the seat provided that a strap guide is utilized. The shoulder strap webbing vest attachment buckle 164 (or tang) is attached to the forward edge 166 of the yoke 146. Thus, forward occupant motion pulls the yoke 146 and shoulder strap webbing 148 out together. Accordingly, the set of restraint shoulder straps 148 and yoke 146 move together. A releasable attachment between the upper attachment buckle 120 of the vest 108 and the upper attachment buckle 164 associated with yoke 146 and shoulder straps 148, can be utilized to accommodate initial connection to the occupant worn vest 108. Accordingly, in some embodiments, a shoulder harness assembly 160 can includes a forward edge 166 with a buckle 164 for releasable attachment. In some embodiments, the at least one retractor 162 is a power haul back type retractor.

FIG. 4A shows the TESS 102 upright and FIG. 4B shows the TESS 102 flexed forward. Note the yoke 146 and shoulder straps 148 move together as a unit. The inertia reels 150 can also be a power haul back type, which could be used in combination with a crash sensor to pull the occupant to the upright position for better spinal alignment prior to a crash event peak acceleration.

Various embodiments of systems, devices, and methods have been described herein. These embodiments are given only by way of example and are not intended to limit the scope of the claimed subject matter. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed subject matter.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A torso equipment support system, for use with a seat bucket of an aviation or a ground vehicle, comprising:
    a base that mounts to the seat bucket at a first lower location;
    a flexible column coupled to the base and biased toward a vertically upright orientation;
    a support beam coupled to and vertically disposed above the flexible column; and
    a shoulder harness assembly coupled to the support beam and configured for releasable attachment with shoulder belts worn by the occupant, the shoulder harness assembly comprising:
        an adjustable yoke slideably coupled to the support beam at a first vertically oriented portion permitting vertical height adjustment and having a second portion that is split into two horizontally projecting members for extension over a shoulder of an occupant; and
        a set of restraint shoulder straps that project inwardly for extension over the shoulder of the occupant from at least one retractor located at a second upper location on the seat bucket, and that extends to a fixed engagement with the two horizontally projecting members.

2. The torso equipment support system of claim 1, wherein the flexible column is made of an elastomer, spring, or mechanical joint.

3. The torso equipment support system of claim 1, wherein the support beam is contoured to the spine of the occupant.

4. The torso equipment support system of claim 1, wherein the set of restraint shoulder straps project from two retractors that comprise dual inertial reels.

5. The torso equipment support system of claim 1, wherein the set of restraint shoulder straps project from a single retractor that is an inertial reel.

6. The torso equipment support system of claim 1, wherein the set of restraint shoulder straps are configured to attach to shoulder belts secured to a vest worn by the occupant.

7. The torso equipment support system of claim 1, wherein the set of restraint shoulder straps and yoke move together.

8. The torso equipment support system of claim 1, wherein the set of restraint shoulder straps and yoke include a forward edge with a buckle for releasable attachment.

9. The torso equipment support system of claim 1, wherein releasable attachment of the set of restraint shoulder straps with the shoulder belts is operably connected to a primary restraint release buckle that is further connected to each of a plurality of restraint lap buckles.

10. The torso equipment support system of claim 1, wherein the base, the flexible support column, and the support beam are located between a seat cushion and the seat bucket.

11. A vehicle seating system providing upper torso and worn equipment support to an occupant, comprising:
   a seat system, including:
      a vehicle seat including a bottom cushion portion and an upright seat back having a top and a bottom;
      a vest for wear by the occupant that includes a pair of shoulder belts for releasable coupling; and
   a torso equipment support system coupled to the seat system including:
      a vertical support assembly structure having a first end and a second end vertically disposed from one another, the first end fixedly secured near the bottom of the upright seat back;
      a shoulder harness assembly coupled to the vertical support assembly structure, comprising:
         an adjustable yoke slideably coupled to the second end of the vertical support assembly structure and including two generally horizontally projecting members for extension over shoulders of the occupant; and
         a set of restraint shoulder straps that project inwardly for extension over the shoulders of the occupant from at least one retractor secured to the vehicle seat, and extending to engagement with the two horizontally projecting members, the shoulder harness assembly configured for releasable coupling with the pair of shoulder belts.

12. The vehicle seating system of claim 11, wherein the vertical support assembly structure includes a base that is fixedly secured near the bottom of the upright seat back.

13. The vehicle seating system of claim 11, wherein the vertical support assembly structure includes a flexible column made of an elastomer, spring, or mechanical joint that is biased toward a vertically upright orientation.

14. The vehicle seating system of claim 11, wherein the vertical support assembly structure includes a support beam contoured to the spine of the occupant.

15. The vehicle seating system of claim 11, wherein the set of restraint shoulder straps project from two retractors that comprise dual inertial reels.

16. The vehicle seating system of claim 11, wherein the set of restraint shoulder straps project from a single retractor that is an inertial reel.

17. The vehicle seating system of claim 11, wherein the at least one retractor is a power haul back type retractor.

18. The vehicle seating system of claim 11, wherein the shoulder harness assembly includes a forward edge with a buckle for releasable attachment.

19. The vehicle seating system of claim 11, wherein the shoulder belts are connected to a primary restraint release buckle on the vest that is connected to a plurality of restraint lap buckles.

20. The vehicle seating system of claim 11, wherein the vertical support assembly structure is at least partially located within a cushion covering the upright seat back of the vehicle seat.

* * * * *